UNITED STATES PATENT OFFICE.

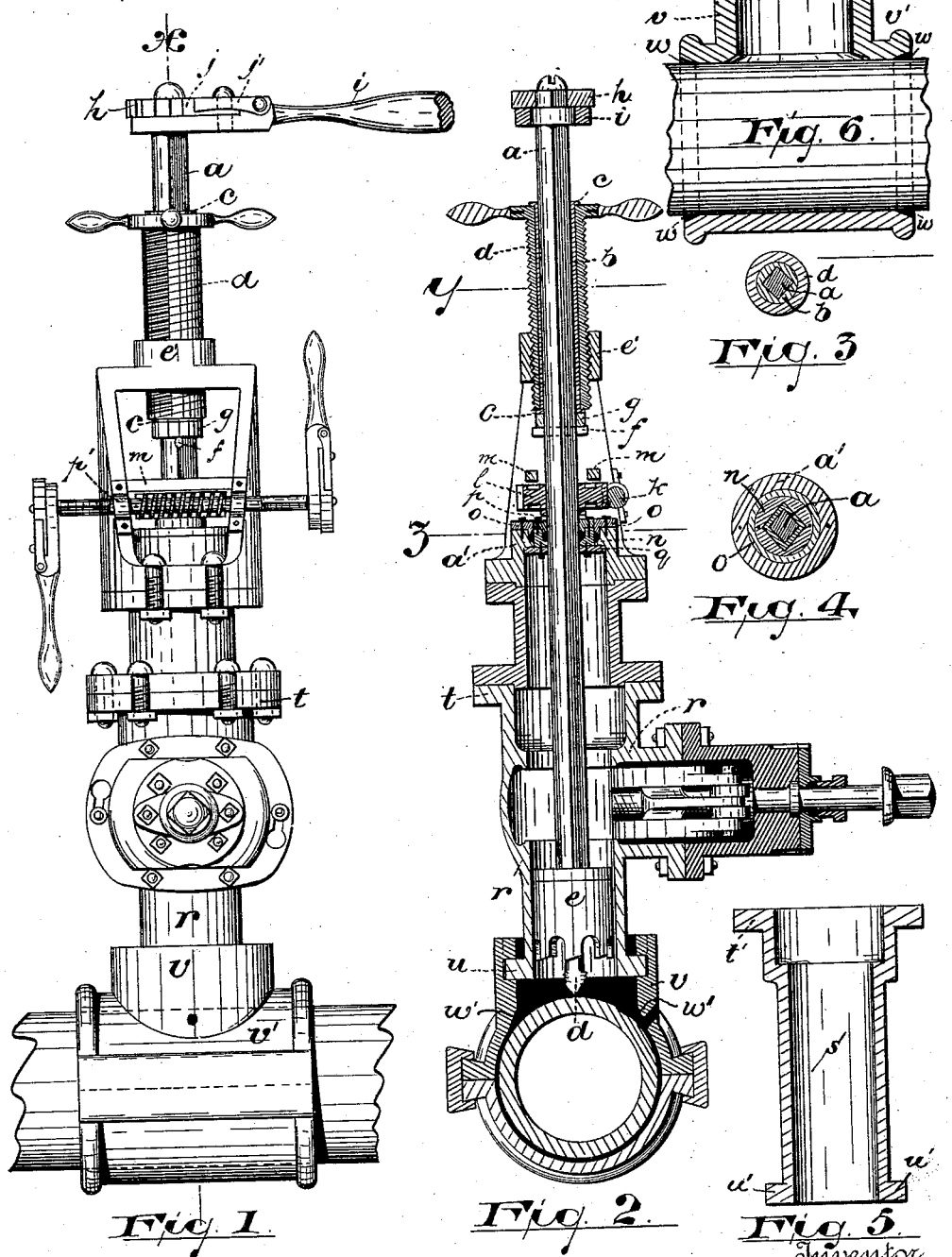

ANTHONY P. SMITH, OF NEWARK, NEW JERSEY.

APPARATUS FOR TAPPING MAINS.

SPECIFICATION forming part of Letters Patent No. 455,890, dated July 14, 1891.

Application filed January 13, 1891. Serial No. 377,630. (No model.)

*To all whom it may concern:*

Be it known that I, ANTHONY P. SMITH, a citizen of the United States, residing at Newark, in the county of Essex and State of New Jersey, have invented certain new and useful Improvements in Apparatus for Tapping Water and other Mains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to that class of tapping-machines shown and described in Letters Patent numbered 396,177 and 419,974, granted to me January 15, 1889, and January 21, 1890, respectively; and the object of the invention is to secure certain advantageous results in the construction and operation of the apparatus, and also economy in respect to the wear and tear thereof, which advantages will hereinafter more fully appear.

Referring to the accompanying drawings, in which similar letters of reference indicate corresponding parts in each of the several figures where they occur, Figure 1 represents in elevation a tapping apparatus embodying my improvements; and Fig. 2, a section through line $x$ of the same, except as to certain parts, which, as will be seen, are in elevation. Figs. 3 and 4 represent sections through lines $y$ and $z$, respectively, of Fig. 2. Fig. 5 represents a central longitudinal section of a certain connecting and gateless pipe, the purpose of which will appear further on; and Fig. 6 is a central longitudinal section through the hub and sleeve, taken at right angles to that shown in Fig. 2 and showing the main in elevation.

In said drawings, $a$ indicates a square or angular shaft which carries a drill $d$ and milling-tool $e$, which are firmly secured to said shaft in the ordinary manner when in use, as indicated in Fig. 2. Around the upper portion of said shaft is snugly fitted a sleeve $b$, circular in form on the outside and having an outwardly-projecting flange $c$ at both ends. Said sleeve is inclosed and works in a hollow or tubular feed-screw $d$, which abuts against said flanges and works in the head $e'$ of the frame of the apparatus, as indicated in the drawings. A bar $f$ or other appropriate fixture passes through or is secured to the shaft $a$ and receives the pressure of the feed-screw as the drill and milling-tool are being operated in tapping a main, as will be understood. A loose or rotary collar or washer $g$ is interposed between the feeding device and said bar $f$ to lessen friction. Said shaft is rotated by means of a ratcheted pinion $h$, fixed to the top of the shaft, and a lever $i$ and pawl $j$, carried thereby; or said parts or others similar to them may be attached to a worm $k$, working in bearings $k'$, attached to the frame and arranged to engage with a gear $l$, carried by the shaft $a$, and through which said shaft works longitudinally as the machine is being operated, the gear being held in position by means of cross-bars $m$, secured to the frame immediately above said gear, and a stuffing-box $n$ below it, as indicated in Figs. 1 and 2. Said stuffing-box is arranged to rotate with the shaft and serves to prevent the water or other contents of the pipe or main from escaping, as will be understood upon reference more particularly to Fig. 2.

In making connections, especially short ones, with mains it is sometimes desirable to dispense with a gate and so save the expense thereof, and to meet this contingency I have devised a gateless pipe S, Fig. 5, to take the place of the gate-pipe $r$ when such a case occurs. Said pipe S is provided with a flange $t'$ and lugs $u'$, corresponding in dimensions and location with those marked $t$ and $u$ on the gate-pipe $r$, as indicated in the drawings. Said pipes S and $r$ are adapted to be connected, respectively, with the hub $v$ of the sleeve by a bayonet-joint, as will be understood upon reference to said Fig. 2.

By means of a square, oval, or angular shaft I am enabled to dispense with a feather, key, or set-screw to hold the gear $l$ in place, and by means of the worm and engaging gear and their adjustment in relation to the apparatus two operating-levers, &c., may be employed and the operators thereof be stationed so as not to be in the way of those operating the feed-screw, as will be understood.

In order to have the sleeve $v'$ to fit the main snugly instead of leaving a comparatively large space between the two, as heretofore, and at the same time to provide adequate space for a packing, I enlarge or bevel the inner surface of the sleeve at the ends outward, as indicated at *w* in Fig. 6, so as to admit the insertion thereat of a packing-ring of sufficient bulk to be effective. I also pursue the same course with the hub of the sleeve at its junction with the main, as indicated at *w'* in Figs. 2 and 6. By this means I am enabled to use a smaller sleeve than is ordinarily used, and also to save lead, as by using the larger sleeve a greater space is left between it and the main, the whole of which throughout the length of the sleeve requires to be filled with lead or other material, as will be obvious.

In respect to the packing at the base of the hub at its junction with the main, the pressure of the fluid tends to force it to or toward its seat, thereby preventing its dislodgment or displacement, as will be obvious.

Having thus described my invention, what I claim as new, and desire to secure by Letters Patent of the United States, is—

1. In a tapping apparatus, the combination, with the feed-screw and cutting devices, of a shaft having unequal diameters and means for rotating the same, as described, for the purposes set forth.

2. In a tapping apparatus, the combination, with the feed-screw and cutting devices, of a shaft *a*, a worm *k*, gear *l*, and means for operating said worm, as described, for the purposes set forth.

3. In a tapping apparatus, the combination, with the shaft and the gear *l*, of means to prevent undue movement of said gear lengthwise of the apparatus, as described, for the purposes set forth.

3. In a tapping apparatus, the combination, with the frame or casing thereof, of a gateless pipe provided with means for coupling the same temporarily thereto and permanently with the hub *v* of the sleeve, as described, for the purposes set forth.

5. In a tapping apparatus, a sleeve adapted to encircle a water or other main and having the inner surface at the ends thereof beveled outward or otherwise enlarged to afford adequate space for a packing, as described, for the purposes set forth.

6. In a tapping apparatus, a sleeve provided with a hub and adapted to encircle a water or other main, said hub having its inner surface at the junction with said main beveled or enlarged to provide space for a packing, as shown and described.

In testimony that I claim the foregoing I have hereunto set my hand this 8th day of January, 1891.

ANTHONY P. SMITH.

Witnesses:
OLIVER DRAKE,
OSCAR A. MICHEL.